US006888841B1

(12) United States Patent
Ozaki

(10) Patent No.: US 6,888,841 B1
(45) Date of Patent: May 3, 2005

(54) PIPELINED SCHEDULING TECHNIQUE

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 648 days.

(21) Appl. No.: 09/708,655

(22) Filed: Nov. 9, 2000

(30) Foreign Application Priority Data

Nov. 10, 1999 (JP) .............................. 11-319762
Feb. 25, 2000 (JP) ....................... 2000-049903

(51) Int. Cl.$^7$ .............................................. H04L 12/56
(52) U.S. Cl. ...................................... 370/413; 370/429
(58) Field of Search ................................ 370/412, 415, 370/416, 413, 414, 355, 230, 443, 390, 58.2, 395.4, 394

(56) References Cited

U.S. PATENT DOCUMENTS

| | | | | |
|---|---|---|---|---|
| 5,299,190 | A | * | 3/1994 | LaMaire et al. ............. 370/413 |
| 5,734,649 | A | * | 3/1998 | Carvey et al. .............. 370/355 |
| 6,044,061 | A | * | 3/2000 | Aybay et al. ............... 370/230 |
| 6,160,812 | A | * | 12/2000 | Bauman et al. ............. 370/416 |
| 6,185,221 | B1 | * | 2/2001 | Aybay ......................... 370/412 |
| 6,353,616 | B1 | * | 3/2002 | Elwalid et al. ............. 370/443 |
| 6,526,060 | B1 | * | 2/2003 | Hughes et al. ............ 370/395.4 |
| 6,574,230 | B1 | * | 6/2003 | Almulhem et al. ......... 370/412 |
| 6,574,232 | B1 | * | 6/2003 | Honig et al. ................ 370/413 |
| 6,654,374 | B1 | * | 11/2003 | Fawaz et al. ................ 370/394 |
| 6,661,788 | B2 | * | 12/2003 | Angle et al. ................. 370/390 |

FOREIGN PATENT DOCUMENTS

| | | |
|---|---|---|
| DE | 195 40 160 A1 | 4/1997 |
| JP | A 3-179850 | 8/1991 |
| JP | A 4-271546 | 9/1992 |
| JP | 2000-174817 | 6/2000 |

\* cited by examiner

*Primary Examiner*—Chi Pham
*Assistant Examiner*—Keith M. George
(74) *Attorney, Agent, or Firm*—Young & Thompson

(57) ABSTRACT

A pipelined scheduling system allowing suppressed unfairness among inputs and reduced fixed delay time is disclosed. Virtual output queues (VOQs) for each input port corresponding to respective ones of the output ports are stored. The VOQs are equally divided into a plurality of groups. Scheduling modules each corresponding to the groups performs a scheduling operation at a single time slot in a round robin fashion such that each of the scheduling modules reserves output ports at a predetermined future time slot for forwarding requests from logical queues of a corresponding group based on a reservation status received from a previous scheduling module, and then transfers an updated reservation status to an adjacent scheduling module. A crossbar switch connects each of the input ports to a selected one of the output ports depending on the reservation status at each time slot.

10 Claims, 6 Drawing Sheets

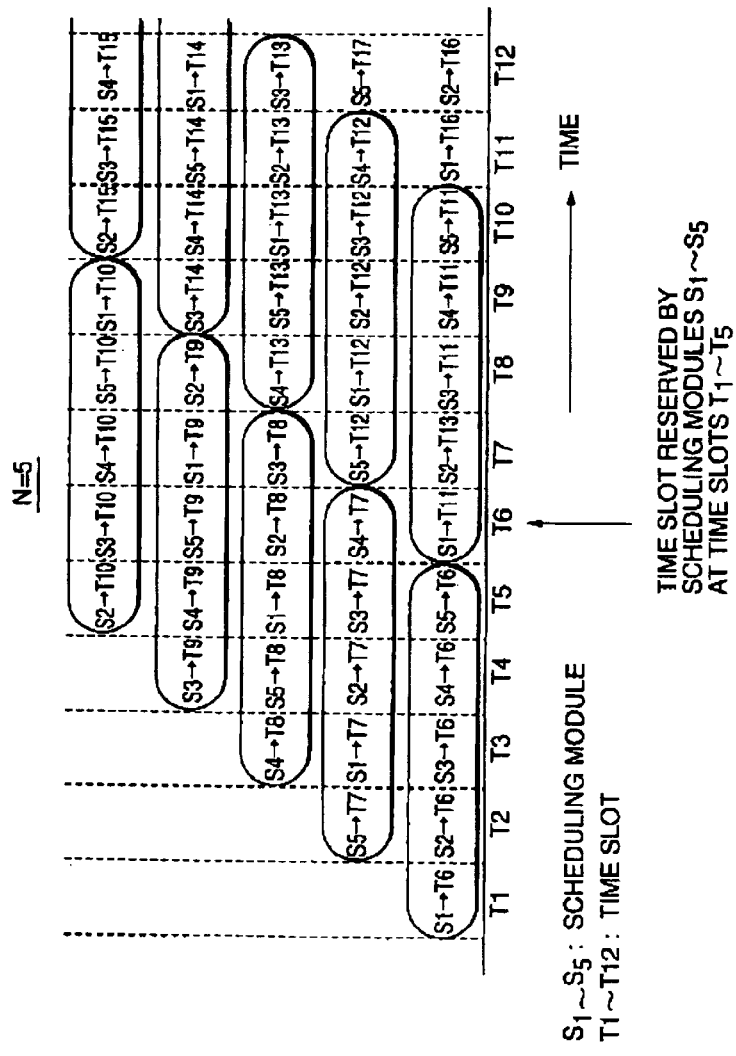

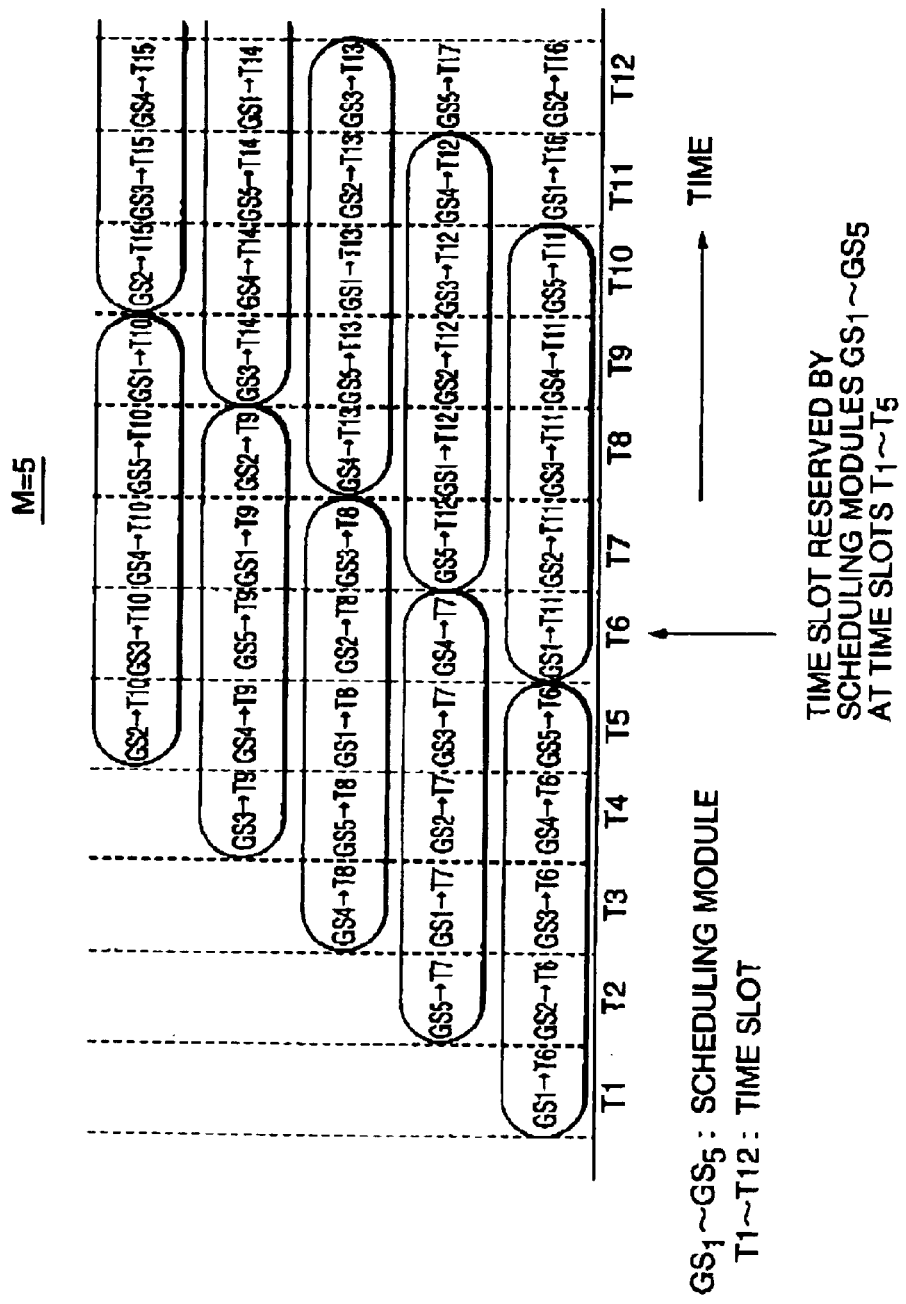

PIPELINED SCHEDULING TECHNIQUE

BACKGROUND OF THE INVENTION

1. Field of the Invention

The present invention relates to a packet switching system and in particular to a pipelined scheduling method and system implemented in the packet switching system.

2. Description of the Prior Art

With the growing demand for bandwidth, there is an increasing need for high-speed switching. To meet such a demand, there has been widely used a crossbar switch having N input ports and N output ports, where each input port has N logical queues each corresponding to the N output ports.

As a promising scheduling protocol applicable to the above reservation at the predetermined future time slot can be completed during N time slots prior to the predetermined future time slot. Such scheduling is performed at each time slot by pipeline processing to achieve N×N scheduling for future time slots.

More specifically, as shown in FIG. 1B, assuming N=5, the scheduling module $S_1$ starts scheduling for the future time slot T6 at the time slot T1 and the following scheduling modules $S_2$ to $S_5$ sequentially perform scheduling for the future time slot T6 at respective time slots T2–T5. Shifting the phase of this scheduling process for the time slot T6 by one time slot, the scheduling module $S_5$ starts scheduling for the future time slot T7 at the time slot T2 and the following scheduling modules $S_1$, to $S_4$ sequentially perform scheduling for the future time slot T7 at respective time slots T3–T6. In this manner, a scheduling module starting each scheduling process sequentially changes in the order presented: $S_1$, $S_3$, $S_4$, $S_3$, and $S_2$. Therefore, all the scheduling modules $S_1$–$S_2$, equally have the right to start a scheduling process.

In this way, N×N scheduling for future time slots is performed by pipeline processing, resulting in high-speed packet forwarding.

In the case where a plurality of adjacent inputs request the same output in the same scheduling process, however, the conventional scheduling method has disadvantages that all the inputs do not have an equal chance of reservation. The unfairness in reservation chance is caused by the fixed connection among the scheduling modules.

Assuming that both Input 2 and Input 3 continue to concurrently request the same Output 4 without any other request, the reservation chance proportion between the Input 2 and the Input 3 is 4:1. Such unfairness is caused by the fact that the number of times the scheduling module $S_3$, makes a reservation earlier than the scheduling module $S_3$ is 4 times higher than the number of times the scheduling module S, makes a reservation earlier than the scheduling module $S_2$. More specifically, as shown in FIG. 1B, at the time slots T6, T7, T8, and T10, the scheduling module $S_2$ makes a reservation earlier than the scheduling module $S_3$. Only at the time slot T9, the scheduling module $S_3$ makes a reservation earlier than the scheduling module $S_2$. Therefore, the reservation chance proportion between the Input 2 and the Input 3 becomes 4:1.

When any two adjacent inputs simultaneously request the same output, the reservation chance proportion between them becomes 4:1. When any three adjacent inputs simultaneously request the same output, the reservation chance proportion between them becomes 3:1:1. In general, when any L adjacent inputs simultaneously request the same output, the reservation chance proportion between them becomes (N−L+1):1:1 .... Therefore, the larger the number of Input/output lines. N, the greater the unfairness. In the case of N=20, the reservation chance proportion between two adjacent inputs is 19:1.

Furthermore, output port reservation at a predetermined future time slot needs N time slots prior to the predetermined future time slot. Therefore, the fixed delay time for packet forwarding is N time slots and the fixed delay time increases as the number of input/output line, N, increases. In the case of N=20, the fixed delay time is 20 time slots.

SUMMARY OF THE INVENTION

An object of the present invention is to provide a pipelined scheduling method and system allowing suppressed unfairness among inputs and reduced fixed delay time.

According to an aspect of the present invention, a pipelined scheduling system for a crossbar switch for connecting a plurality of input ports to selected ones of a plurality of output ports at each time slot, includes: a plurality of logical queues for each of the input ports, corresponding to respective ones of the output ports, wherein the logical queues are equally divided into a plurality of groups; and a plurality of scheduling modules each corresponding to the groups, wherein each of the scheduling modules performs a scheduling operation at a single time slot in a round robin fashion such that each of the scheduling modules reserves output ports at a predetermined future time slot for forwarding requests from logical queues of a corresponding group based on a reservation status received from a previous scheduling module, and then transfers an updated reservation status to an adjacent scheduling module. The crossbar switch connects each of the input ports to a selected one of the output ports depending on the reservation status at each time slot.

Each of the scheduling modules preferably gives an equal chance of reservation to the forwarding requests from the logical queues of the corresponding group.

According to another aspect of the present invention, a scheduling system for a plurality of inputs, includes: a grouping section for grouping the plurality of inputs into a plurality of groups, each of which includes at least two inputs; an allocating section for allocating a selected one of a plurality of services to each input included in each of the groups, and a pipeline scheduling section for scheduling the inputs among the groups in pipelines.

The plurality of services may provide respective ones of packet forwarding connections from a plurality of input ports to selected ones of a plurality of output ports in a crossbar switch. Each of the allocating section preferably gives an equal chance of allocation to the inputs included in a corresponding group.

According to still another aspect of the present invention, a pipelined scheduling method for an N×N crossbar switch for connecting N input ports to selected ones of N output ports at each time slot, includes the steps of: a) storing N logical queues for each of the N input ports, corresponding to respective ones of the N output ports, wherein the N logical queues are equally divided into M groups; b) performing the following steps (b.1) through (b.3) at a single time slot among the M groups in a round robin fashion: b.1) reserving output ports at a predetermined future time slot for forwarding requests from logical queues of each of the groups based on a reservation status resulting from a previous group: b.2) updating the reservation status depending on which output ports are reserved; and b.3) transferring an updated reservation status to an subsequent group; and c) connecting each of the N input ports to a selected one of the N output ports depending on the reservation status at each time slot in pipelines.

As described above, according to the present invention, logical queues are divided into a plurality of groups, which are subject to pipelined scheduling. Therefore, when any two adjacent inputs simultaneously request the same output, the reservation chance proportion between them becomes (M-1):1, which is much smaller than the conventional one (N-1): 1. Especially, in the case of M=2, the unfairness problem is resolved.

Furthermore, output port reservation at a predetermined future time slot needs M time slots prior to the predetermined future time slot. Therefore, the fixed delay time for packet forwarding is reduced to M time slots.

BRIEF DESCRIPTION OF THE DRAWINGS

FIG. 1B is a time chart showing conventional scheduling performed in the conventional switching system;

FIG. 5 is a time chart showing the grouped scheduling performed in the packet switching system of FIG. 4.

DETAILED DESCRIPTION OF THE PREFERRED EMBODIMENT

Figure 1A:
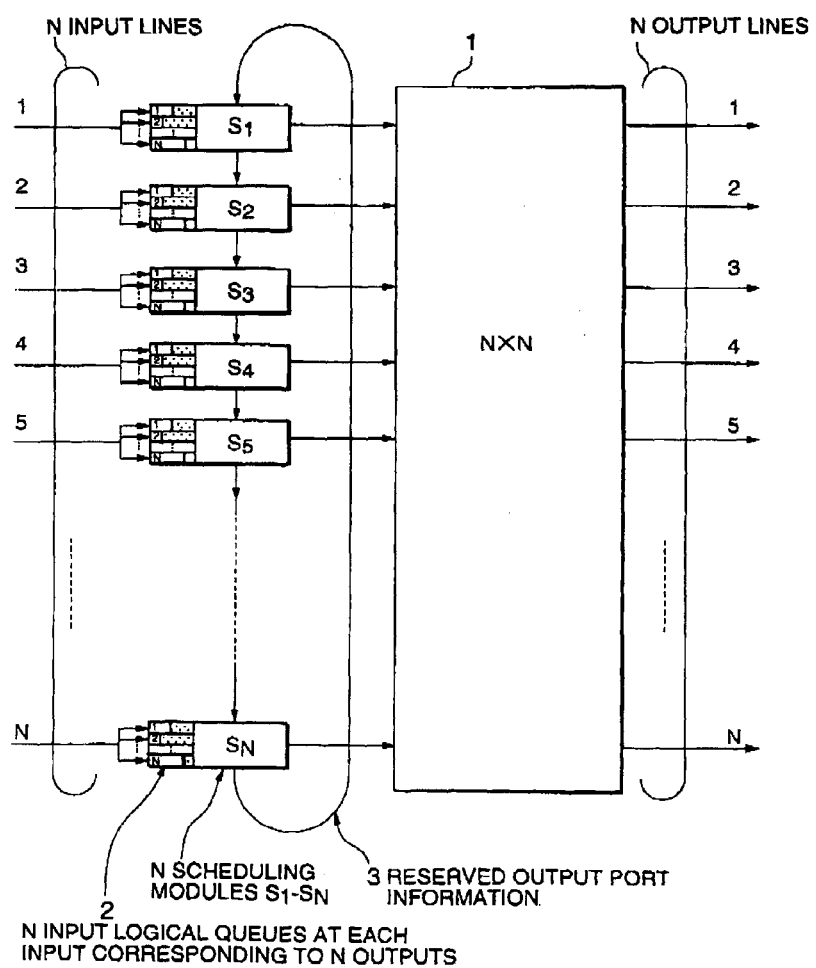
FIG. 1A is a block diagram showing the circuit configuration of a conventional switching system.
Figure 2:
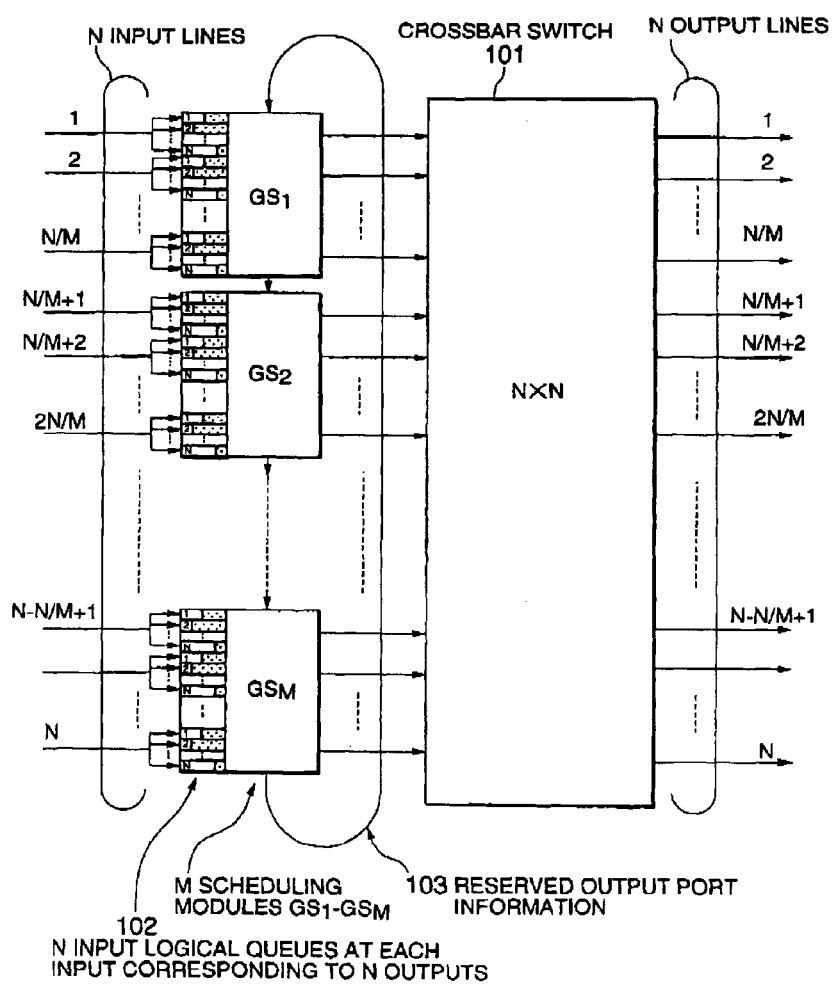
FIG. 2 is a block diagram showing the circuit configuration of a packet switching system according to an embodiment of the present invention.

Referring to FIG. 2, a packet switching system according to an embodiment of the present invention is provided with an N×N crossbar switch 101 having N input ports and N output ports, where N is an integer greater than 1. N input lines are equally divided into M groups each corresponding to M scheduling modules $GS_1$-$GS_M$, where M is a submultiple of N greater than 1 and not greater than N/2. N virtual output queues (VOQs) 102 are provided at each of N inputs, corresponding to the N output ports, respectively.

Each of the scheduling modules $GS_1$-$GS_N$ executes N/M scheduling processes for a predetermined future time slot in a single time slot based on packet forwarding requests of the corresponding N/M VOQs. The reserved output port information 103, or reservation status, updated by one scheduling module is transferred to an adjacent scheduling module. Here, a packet to be forwarded has a fixed length and one time slot is defined as a time period required for forwarding a packet from one input port to one output port. When receiving the reserved output port information 103 from the previous scheduling module, the adjacent scheduling module makes a reservation of available output port based on the reserved output port information 103 so as to avoid coming into collision with other scheduling modules.

In this way, N/M scheduling processes are performed by the scheduling modules $GS_1$-$GS_M$ while transferring reserved output port information 103 to an adjacent scheduling module in round robin fashion. Therefore. (N/M×N) scheduling processes for the predetermined future time slot are completed for M time slots.

Figure 3:
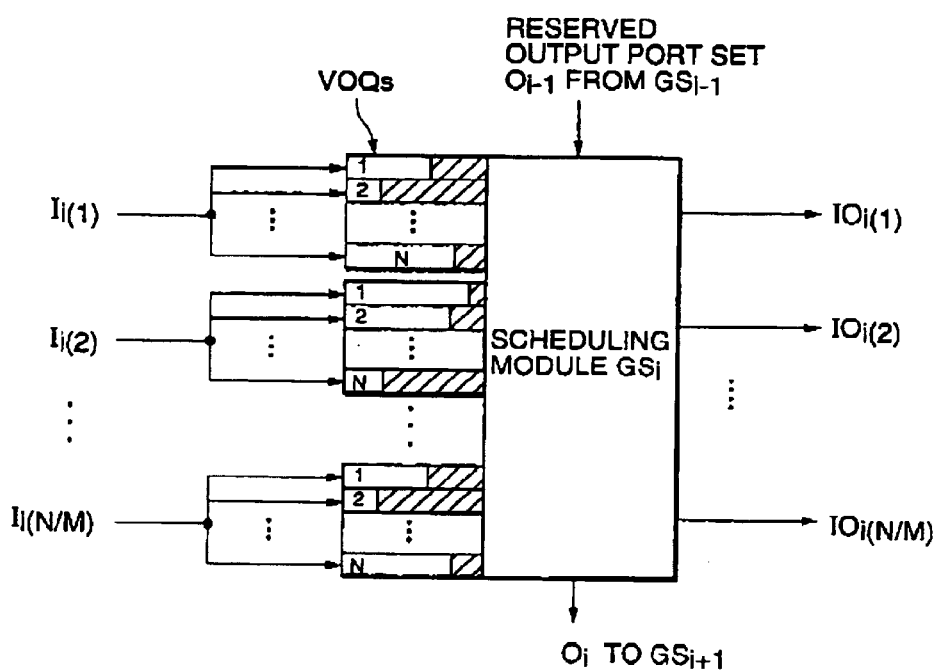
FIG. 3 is a diagram showing a scheduling module used in the embodiment.

Referring to FIG. 3, a scheduling module GSi (i=1, 2, ..., or M) performs N/M scheduling processes and transfer of the reserved output port information 103 for one time slot based on a set of reserved output ports. $O_{i-1}$, received from the previous scheduling module $GS_{i-1}$. It is necessary that the scheduling at the scheduling module GSi is completed for one time slot and further meets the fairness requirement such that the N/M inputs Ii(l)-Ii(N/M) have an equal chance of reservation. In other words, If the one-time-slot completion and fairness requirements are satisfied, any scheduling algorithm may be employed in the scheduling module $GS_1$.

For example, a scheduling algorithm disclosed in U.S. Pat. No. 5,734,649 may be used. More specifically, by searching a matrix of N×N forwarding requests, allocation of the forwarding requests to desired connections is accomplished. N inputs and N outputs are rearranged in accordance with pseudo-ransom shuffle patterns during each interval, ensuring fairness.

Figure 4:
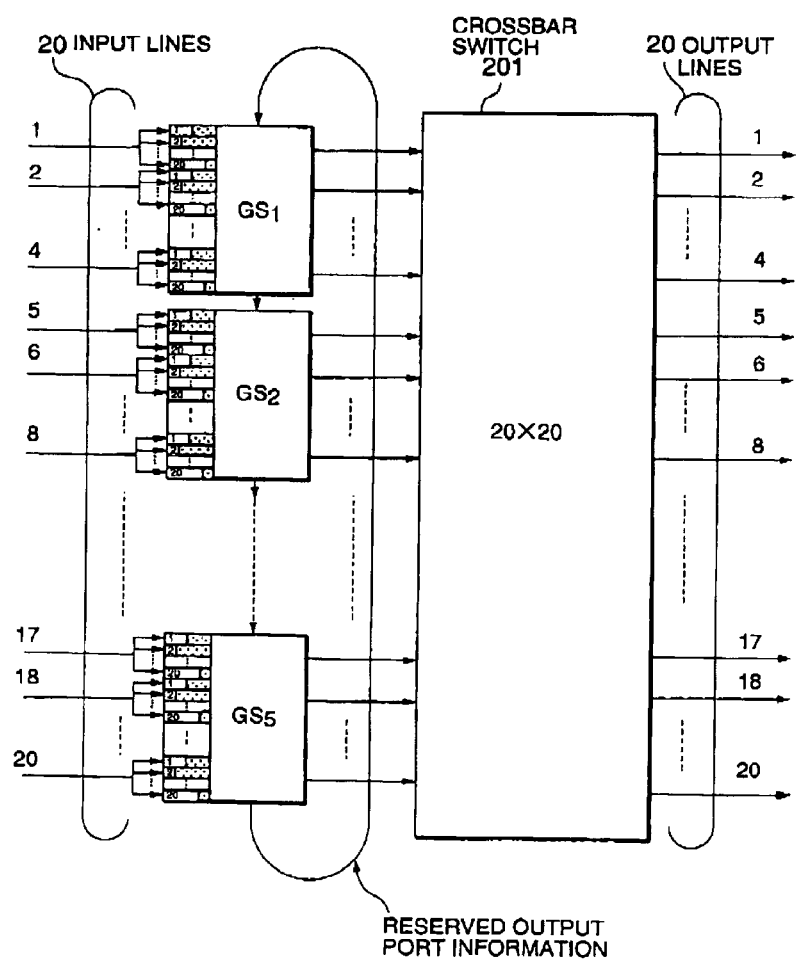
FIG. 4 is a block diagram showing an example of the packet switching system according to the embodiment of the present invention.

FIG. 4 shows an example of the packet switching system as shown in FIG. 2 in the case of N=20 and M=5. As shown in FIG. 4, a switching system is provided with an 20×20 crossbar switch 201 having 20 input ports and 20 output ports. 20 Input lines are equally divided into 5 groups each corresponding to 5 scheduling modules $GS_1$-$GS_3$. 20 VOQs are provided at each input, corresponding to the 20 output ports, respectively.

Each of the scheduling modules $GS_1$-$GS_5$ executes 4 scheduling processes for a predetermined future time slot in a single time slot based on packet forwarding requests of the corresponding 4 VOQs. The reserved output port information updated by one scheduling module is transferred to an adjacent scheduling module. When receiving the reserved output port information from the previous scheduling module, the adjacent scheduling module makes a reservation of available output port based on the reserved output port information so as to avoid coming into collision with other scheduling modules.

In this way, 4 scheduling processes are performed by the port information to an adjacent scheduling module in round robin fashion. Therefore 4×20 scheduling processes for the predetermined future time slot are completed for 5 time slots.

As shown in FIG. 5, in the case of N=20 and M=5, the scheduling module $GS_1$ starts scheduling of inputs 1–4 for the future time slot T6 at the time slot T1. If there are packet forwarding requests at the inputs 1–4, then the scheduling module $GS_1$ arbitrates the packet forwarding requests to reserve respective outputs from available output ports for future time slot T6 so that the fairness is ensured as described before. The scheduling module $GS_1$ removes the reserved output ports from the reserved output port information and transfers the updated information to the adjacent scheduling module $GS_2$.

The following scheduling modules $GS_2$ to $GS_5$ sequentially perform the above-described scheduling for the future time slot T6 at respective time slots T2–T5. Shifting the phase of this scheduling process for the time slot T6 by one time slot, the scheduling module $GS_5$ starts the above-described scheduling for the future time slot T7 at the time slot T2 and the following scheduling modules $GS_1$ to $GS_4$ sequentially perform the above-described scheduling for the future time slot T7 at respective time slots T3–T6. In this manner, a scheduling module starting each scheduling process sequentially changes in the order presented: $GS_1$, $GS_3$, $GS_4$, $GS_3$, and $GS_2$. Therefore, all the scheduling modules $GS_1$-$GS_5$ equally have the right to start a scheduling process.

According to the present invention, when any two adjacent inputs simultaneously request the same output, the reservation chance proportion between them is improved from (N−3):1, to (M−1):1. In the case of N=20 and M=5, the reservation chance proportion between two adjacent inputs is 4:1, compared with the conventional proportion 19:1. Especially, in the case of M=2, the unfairness is resolved.

Furthermore, output port reservation at a predetermined future time slot needs M time slots prior to the predetermined future time slot. Therefore, the fixed delay time for packet forwarding is reduced from N time slots to M time slots.

The present invention is not limited to N×N crossbar switch. In the case where the number of inputs is different from that of outputs, the present invention may be also applicable.

What is claimed is:

1. A pipelined scheduling system for a crossbar switch for connecting a plurality of input ports to selected ones of a plurality of output ports at each time slot, comprising:

a plurality of logical queues for each of the input ports, corresponding to respective ones of the output ports, wherein the input ports are equally divided into a plurality of groups; and a plurality of scheduling modules each corresponding to the groups, wherein each of the scheduling modules performs a scheduling operation at a single time slot in a round robin fashion such that each of the scheduling modules reserves output ports at a predetermined future time slot for forwarding requests from logical queues of a corresponding group based on a reservation status received from a previous scheduling module, and then transfers an updated reservation status to an adjacent a subsequent scheduling module, wherein the crossbar switch connects each of the input ports to a selected one of the output ports depending on the reservation status at each time slot.

2. The pipelined scheduling system according to claim 1, wherein each of the scheduling modules gives an equal chance of reservation to the forwarding requests from the logical queues of the corresponding group.

3. A scheduling system for a plurality of inputs, comprising:

a grouping section for grouping the plurality of inputs into a plurality of groups, each of which includes at least two inputs;

an allocating section for allocating a selected one of a plurality of services to each input included in each of the groups; and a pipeline scheduling section for scheduling the inputs among the groups in pipelines.

4. The scheduling system according to claim 3, wherein the plurality of services provide respective ones of packet forwarding connections from a plurality of input ports to selected ones of a plurality of output ports in a crossbar switch.

5. The scheduling system according to claim 4, wherein each of the allocating section gives an equal chance of allocation to the inputs included in a corresponding group.

6. A pipelined scheduling method for an N×N crossbar switch for connecting N input ports to selected ones of N output ports at each time slot, comprising the steps of:

a) storing N logical queues for each of the N input ports, corresponding to respective ones of the N output ports, wherein the N input ports are equally divided into M groups;

b) performing the following steps (b.1) through (b.3) at a single time slot among the M groups in a round robin fashion;

b.1) reserving output ports at a predetermined future time slot for forwarding requests from logical queues of each of the groups based on a reservation status resulting from a previous group;

b.2) updating the reservation status depending on which output ports are reserved; and b.3) transferring an updated reservation status to an subsequent group; and c) connecting each of the N input ports to a selected one of the N output ports depending on the reservation status at each time slot in pipelines.

7. The pipelined scheduling method according to claim 6, wherein, in the step (b.1), an equal chance of reservation is given to the forwarding requests from the logical queues of the corresponding group.

8. A scheduling method for a plurality of inputs, comprising the steps of:

grouping the plurality of inputs into a plurality of groups, each of which includes at least two inputs;

allocating a selected one of a plurality of services to each input included in each of the groups; and scheduling the inputs among the groups in pipelines.

9. The scheduling method according to claim 8, wherein the plurality of services provide respective ones of packet forwarding connections from a plurality of input ports to selected ones of a plurality of output ports in a crossbar switch.

10. The scheduling method according to claim 9, wherein an equal chance of allocation is given to the inputs included in a corresponding group.

* * * * *